United States Patent [19]
Huang

[11] Patent Number: 5,475,716
[45] Date of Patent: Dec. 12, 1995

[54] METHOD FOR COMMUNICATING BLOCK CODED DIGITAL DATA WITH ASSOCIATED SYNCHRONIZATION/CONTROL DATA

[75] Inventor: Zheng Huang, Willow Grove, Pa.

[73] Assignee: GI Corporation, Hatboro, Pa.

[21] Appl. No.: 184,500

[22] Filed: Jan. 18, 1994

[51] Int. Cl.⁶ .................................................. H04L 7/00
[52] U.S. Cl. .......................... 375/354; 371/37.1; 371/42; 370/105.1
[58] Field of Search .................................... 375/106, 112; 370/105.1, 105.4, 99; 371/37.1, 37.4, 37.5, 42

[56] References Cited

U.S. PATENT DOCUMENTS

| | | | |
|---|---|---|---|
| 3,571,794 | 3/1971 | Tono | 371/42 |
| 4,271,520 | 6/1981 | Coombes et al. | 371/42 |
| 4,312,070 | 1/1982 | Coombes et al. | 371/42 |
| 4,694,473 | 9/1987 | Etoh | 371/42 |
| 5,117,427 | 5/1992 | Miyake et al. | 371/42 |
| 5,142,539 | 8/1992 | Dahlin et al. | 371/37.1 |
| 5,168,509 | 12/1992 | Nakamura et al. | 371/375 |
| 5,233,629 | 8/1993 | Paik et al. | 375/39 |
| 5,321,725 | 6/1994 | Paik et al. | 371/37.5 |
| 5,333,135 | 7/1994 | Wendorf | 370/99 |

*Primary Examiner*—Stephen Chin
*Assistant Examiner*—T. Ghebretinsae
*Attorney, Agent, or Firm*—Barry R. Lipsitz

[57] ABSTRACT

Block coded digital data is communicated with associated overhead data in a data stream having a succession of coded blocks. Each block contains N symbols wherein M of the symbols comprise information to be transmitted and the remaining N-M of the symbols comprise error correcting data. The ratio M/N comprises a first information rate. The coded blocks in the data stream are divided into a succession of frames, each comprising F of the coded blocks. A frame overhead symbol is added for each of the frames, to provide the data necessary for a receiver function such as synchronization. The addition of the frame overhead symbols effectively lowers the first information rate to a second desired information rate. A plurality of X of the frames are formed into a superframe containing FX coded blocks and associated frame overhead symbols. X is chosen to provide enough n-bit frame overhead symbols to implement the desired receiver function.

16 Claims, 2 Drawing Sheets

METHOD FOR COMMUNICATING BLOCK CODED DIGITAL DATA WITH ASSOCIATED SYNCHRONIZATION/CONTROL DATA

BACKGROUND OF THE INVENTION

The present invention relates to a practical method for communicating block coded digital data and associated overhead such as synchronization and/or control data. The invention is generally applicable to any block coded communication system, such as a digital cable television system or the like. Thus, although the invention is described herein in connection with a specific application, it should be appreciated that its scope is not limited to the communication of any particular type of block coded signal or to any particular modulation or transmission scheme.

Digital data, for example digitized video for use in broadcasting digitized conventional or high definition television (HDTV) signals, can be transmitted over satellite, terrestrial or cable VHF or UHF analog channels for communication to end users. Analog channels deliver corrupted and transformed versions of their input waveforms. Corruption of the waveform, usually statistical, may be additive and/or multiplicative, because of possible background thermal noise, impulse noise, and fades. Transformations performed by the channel are frequency translation, nonlinear or harmonic distortion and time dispersion. Various well known coding schemes, such as Reed-Solomon block coding, are available to correct errors introduced by an analog communication path.

In order to communicate digital data via an analog channel, the data is modulated using, for example, a form of pulse amplitude modulation (PAM). Typically, quadrature amplitude modulation (QAM) is used to increase the amount of data that can be transmitted within an available channel bandwidth. QAM is a form of PAM in which a plurality of bits of information are transmitted together in a pattern referred to as a "constellation" that can contain, for example, sixteen, thirty-two or sixty-four points. An example of a system for communicating digital data using QAM, and specifically trellis coded QAM, is provided in U.S. Pat. No. 5,233,629 to Paik, et al., incorporated herein by reference.

In order to reliably communicate digital information, some scheme must be provided to correct the inevitable transmission errors that will occur. A block code is one type of error correcting code that is well known in the art of digital communication. In a block code, M input binary symbols are mapped into N output binary symbols. Since N is greater than M, the code can be selected to provide redundancy, such as parity bits, which are used by the decoder to provide some error detection and error correction. The codes are denoted by (N, M) where the code rate R is defined by R=M/N. Practical values of R range from ¼ to about one, and M ranges from three to several hundred, as reported by G. C. Clark, Jr. and J. B. Cain, "Error-Correction Coding for Digital Communications," Plenum Press, New York, 1981.

The improvement in the performance of a digital communication system that can be achieved by the use of coding is substantial. However, it is necessary to synchronize the encoder at the transmitter with the decoder at the receiver. Such synchronization requires additional "overhead" data to be transmitted to the receiver. It may also be desirable to transmit other overhead data, such as channel identification data, I or Q component identification data, error messages, and the like. Usually, the overhead data is combined directly with the information to be communicated. Although the necessity for transmitting overhead data lowers the overall information data rate, the coding gains achieved more than compensate for this inefficiency.

In past systems, such overhead data was typically included with the information being transmitted and resided together with the information in coded blocks. Such prior art schemes require rather complicated circuitry at the decoder to strip the overhead data from the actual information being communicated. It would therefore be advantageous to provide an improved scheme for incorporating synchronization and other necessary control data into a transmitted information stream. It would be further advantageous to provide such a scheme in which a desired ratio of information data to transmitted data can be easily achieved after synchronization and control overhead data has been inserted.

The present invention provides a method for inserting frame overhead, such as synchronization and control data, into an information stream while providing a desired information/transmission ratio. A result of the invention is to allow overhead to be inserted while preserving a clear data field (without overhead) for the information to be communicated. The invention also provides a flexible technique for changing the size of blocks of transmitted data while maintaining a desired information rate. This advantage enables a particular design requirement, such as an industry standard (e.g., MPEG) block size, to be met while maintaining the desired information rate.

SUMMARY OF THE INVENTION

In accordance with the present invention, a method is provided for communicating block coded digital data and associated overhead data. A data stream is provided having a succession of coded blocks, each block containing N symbols where M of said symbols comprise information to be transmitted and the remaining N-M of said symbols comprise error correcting data, the ratio M/N comprising a first information rate. The coded blocks in the data stream are divided into a succession of frames. Each frame comprises F of said coded blocks. A frame overhead symbol is added for each of the frames. The frame overhead symbols contain data necessary to provide a function, such as a synchronization and/or a control function at a receiver. The addition of the frame overhead symbols effectively lowers the first information rate to a second information rate M'/N' where M'/N'=(M'+b)/(N'+b) and b is an integer chosen to provide the second information rate at a desired value. M, N, M', N' and b are all integers. N is less than or equal to $2^n+1$, where n is the number of bits in each of the symbols. The number F of coded blocks in each frame is determined from the relationship F=M'P/(N-M)b. P is an integer that is chosen to render F an integer. Preferably, P is chosen to be the lowest value integer that renders F an integer. Further, P is the number of overhead symbols to be added per frame.

In a preferred embodiment, a plurality X of said frames are formed into a superframe containing FX coded blocks and PX frame overhead symbols. X is chosen to provide enough n-bit frame overhead symbols (i.e., PX) to provide said function (e.g., synchronization) at the receiver. The X frame overhead symbols can be added at the end of the superframe after the X frames.

In an illustrated embodiment, the first information rate is 122/128 and the second information rate is 120/126 (i.e., 20/21). Thus, (N-M) is six and b is two. Each symbol comprises seven bits. Further, six frame overhead symbols are added to each superframe of sixty coded blocks (i.e., F=10 and X=6). The six frame overhead symbols can simply be appended at the end of the superframe. Further, the coded blocks can comprise Reed-Solomon blocks, each containing 128 seven-bit symbols.

DETAILED DESCRIPTION OF A PREFERRED EMBODIMENT

Figure 1:
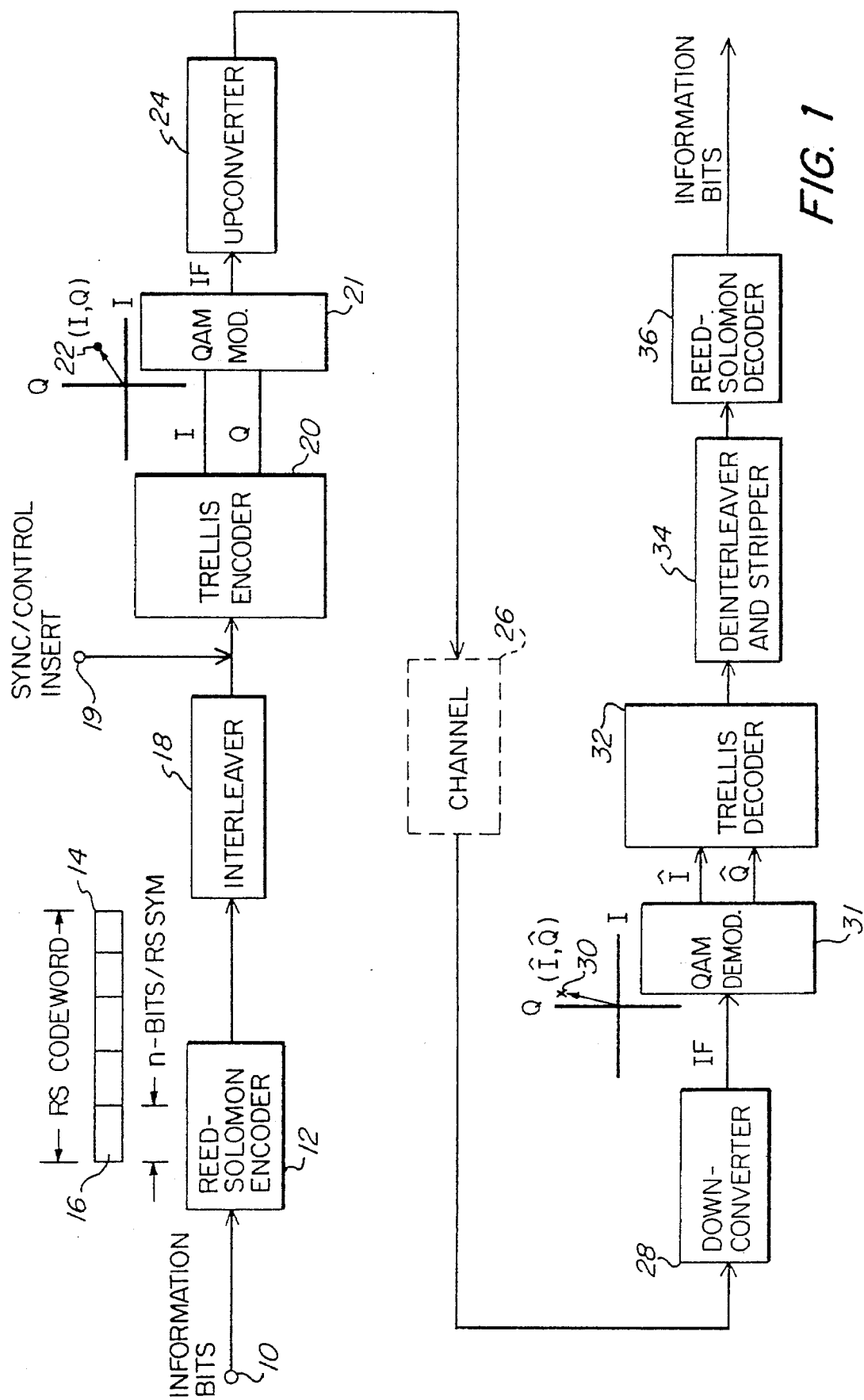
FIG. 1 is a block diagram of a transmission system employing block coding.

FIG. 1 illustrates an example of a communication scheme that can benefit from the method of the present invention. In particular, the figure shows a concatenated coding system for communicating QAM data. Digital information to be transmitted is input to a symbol error correcting coder 12, such as a Reed-Solomon encoder, via an input terminal 10. Encoder 12 converts the information into a block 14 ("RS Codeword"), comprising a plurality N of successive n-bit coded symbols 16, where n=7. Of the N coded symbols, M represent the actual information to be communicated and the remaining N-M parity symbols comprise error correcting redundancy.

While an outer convolutional code could be used for encoder 12, the bursty nature of the errors in a transmission system, the fact that only hard quantized data is available, and the desirability of a high rate code make a Reed-Solomon code, whose symbols are formed from n-bit segments of the binary stream, a good choice for the outer code. Since the performance of a Reed-Solomon code only depends on the number of symbol errors in the block, such a code is undisturbed by burst errors within an n-bit symbol. However, the concatenated system performance is severely degraded by long bursts of symbol errors. Therefore, an interleaver 18 is provided at the output of Reed-Solomon encoder 12, to interleave the symbols (as opposed to individual bits) between coding operations. The intent of the interleaving is to break up the bursts of symbol errors.

It may be desirable to insert synchronization and/or control information into the transmitted data stream. This may be required, for example, where the information data being communicated does not already contain synchronization information and/or other overhead. In such a case, after the Reed-Solomon symbols are interleaved, control symbols (which include synchronization symbols) are added via terminal 19 at a rate of one seven-bit control symbol for each frame of Reed-Solomon blocks. In the illustrated embodiment, each Reed-Solomon block comprises either 127 or 128 Reed-Solomon symbols. A frame comprises F such blocks. Where the blocks contain 128 Reed-Solomon symbols, including 122 information symbols and six parity symbols, F=10. Where each block contains 127 Reed-Solomon symbols, including 121 information symbols and six parity symbols, F=20.

The interleaved Reed-Solomon symbols with control symbols added in accordance with the present invention are input to a trellis encoder 20 and QAM modulator 21. The output of modulator 21 comprises symbols representative of coordinates in the real (I) and imaginary (Q) planes of a QAM constellation pattern. One such constellation point 22 is symbolically illustrated in FIG. 1. The symbols are transmitted by a conventional transmitter 24 via a communication channel 26. The communication channel introduces various distortions and delays that corrupt the signal before it is received by a receiver 28. As a result, the coordinate values embodied in the received symbols will not correlate exactly with the transmitted coordinate values, such that a received point 30 will end up on the constellation pattern in a different location than the actual transmitted point 22. In order to determine the correct location for the received point, and thereby obtain the data as actually transmitted, the received data $(\hat{I}, \hat{Q})$ is demodulated in a QAM demodulator 31 and input to a trellis decoder 32 that uses a soft-decision convolutional decoding algorithm to recover the transmitted information.

The decoded output from decoder 32 is input to a deinterleaver and control symbol stripper 34 that strips out the control symbols and reverses the effects of interleaver 18 discussed above. The deinterleaved data is input to a Reed-Solomon decoder 36 for recovery of the original information bits.

In the illustrated embodiment, each Reed-Solomon block comprises N seven-bit coded symbols of which M coded symbols represent information to be communicated. The remaining N-M coded symbols comprise error correcting overhead, specifically parity information. Thus, for a 128 symbol Reed-Solomon block, 122 symbols carry the actual information to be communicated, and the remaining six symbols provide parity information for use at the receiver.

The use of a 121/127 or 122/128 Reed-Solomon rate facilitates the provision of synchronization symbols for use by the receiver in synchronizing the deinterleaver. In these embodiments, a seven-bit control symbol can be inserted for every F Reed-Solomon blocks in synchronization with the interleaver. The control symbols include synchronization symbols for use by the receiver, after being output from the trellis decoder, to determine the start of successive Reed-Solomon blocks and to synchronize the deinterleaver. As an example, where a Reed-Solomon rate of 122/128 is used, one control symbol (P=1) can be inserted for every 1280 encoded Reed-Solomon symbols (F=10). Where a Reed-Solomon rate of 121/127 is used, one control symbol can be added for every 2540 encoded Reed-Solomon symbols (F=20). F defines the size (in blocks) of a frame of Reed-Solomon symbols. NF defines the number of Reed-Solomon symbols per frame. Thus, for a Reed-Solomon rate of 122/128, there are 128×10=1280 Reed-Solomon symbols per frame. For a Reed-Solomon rate of 121/127, there are 127×20=2540 Reed-Solomon symbols per frame. In either event, the addition of the P control symbols per frame results in an effective transmission rate (information data/total data transmitted) of 120/126. This result is verified as follows:

For the 122/128 rate, F=10 and one control symbol is added per frame. Thus, the information rate to transmitted data rate for the frame is 1220/(1280+1) =1220/1281=120/126.

For the 121/127 rate, F=20 and one control symbol is added per frame. Thus, the information rate to transmitted data rate for the frame is (121× 20)/((127×20)+ 1)=2420/2541= 120/126.

In order for the control symbols to appear in proper order after the trellis decoder, they are inserted in the same symbol position in consecutive frames. At the decoder, the control symbols are removed before the symbols from the trellis decoder are input to the Reed-Solomon decoder.

Figure 2:
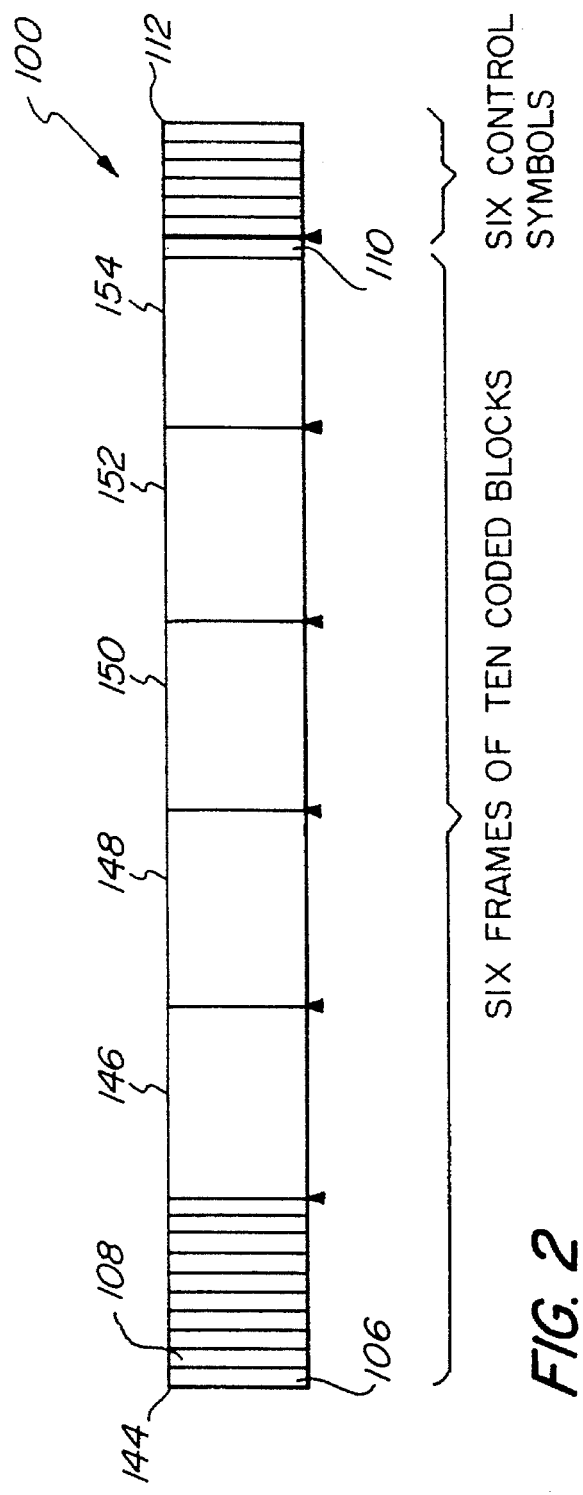
FIG. 2 is a diagrammatic illustration of a superframe of blocks provided by a symbol error correcting code with inserted overhead data in the form of control symbols for synchronization and/or control functions in accordance with the present invention.
Figure 3:
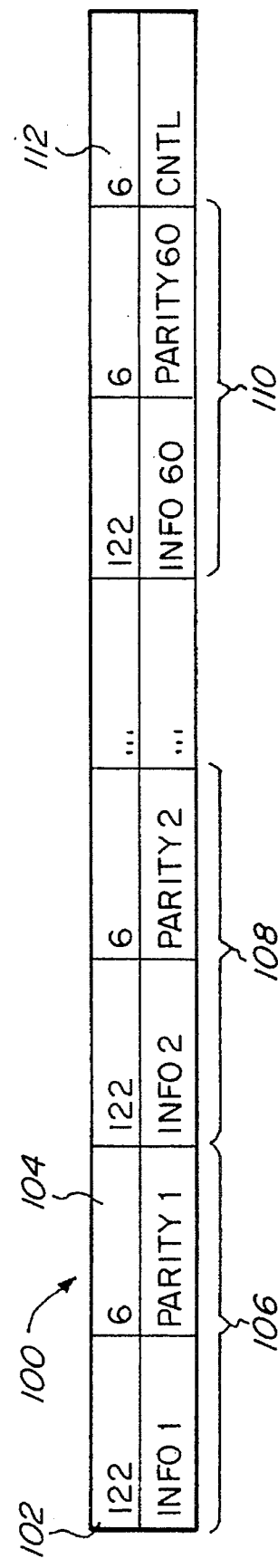
FIG. 3 is a more detailed diagram of portions of FIG. 2.

A specific implementation of a plurality of Reed-Solomon blocks with inserted synchronization symbols is illustrated in FIGS. 2 and 3. In this implementation, a superframe 100 includes six ten-block frames 144, 146, 148, 150, 152, 154 for a total of sixty Reed-Solomon blocks. As shown in greater detail in FIG. 3, each Reed-Solomon block 106, 108 . . . 110 includes an information portion 102 comprising 122 information symbols and a parity portion 104 comprising six parity symbols, for a total of 128 Reed-Solomon symbols per block. One control symbol (P=1) is provided for each frame of ten blocks. Thus, there are a total of six control symbols together designated 112 provided for the six frames (sixty blocks) of Reed-Solomon symbols. This translates into a total of 53,760 Reed-Solomon bits (128×7×60) and forty-two control bits (6×7) per superframe, or 7,686 symbols per superframe.

Of the six control symbols 112 provided in the example of FIGS. 2 and 3, some can be used for synchronization and others can be used for control functions. For example, if four of the seven-bit control symbols are used for synchronization, a 28-bit synchronization pattern can be provided for detection at a decoder. The decoder searches for the synchronization pattern to determine the end of each superframe. The remaining two control symbols in each superframe can be used, for example, to identify whether the system is using sixty-four QAM or sixteen QAM, and for parity.

Additional control symbols can be added, if necessary, by increasing the size of the superframe. For each additional control symbol, another ten-block frame of Reed-Solomon symbols must be added to the superframe.

At the decoder, all of the parity symbols and control symbols are stripped from the superframe before further processing of the information data. Once carrier recovery synchronization is achieved, a search process is undertaken to identify the 28-bit synchronization code. Once this procedure is complete, frame synchronization is achieved by detecting the 28-bit synchronization sequence transmitted every superframe. The synchronization pattern is designed to have low correlation to shifted versions of itself, and to other predictable sections of the incoming waveform, as well known in the art.

The specific implementation discussed above is useful, for example, in communicating digital television signals over a cable television network. However, the invention is applicable to any type of communication scheme in which it is desired to add synchronization and/or control data to a block coded information stream. In a generalized embodiment, each of the coded information blocks contains N symbols. M of the symbols comprise information to be transmitted and the remaining N-M of the symbols comprise error correcting (e.g., parity) data. The ratio M/N comprises a first information rate. The coded blocks in the data stream are divided into a succession of frames, each comprising F of the coded blocks. A plurality PX of frame overhead symbols is added to each group of X frames forming a superblock. The frame overhead symbols contain data necessary to provide a function (e.g., synchronization and/or control functions) at the receiver.

The addition of the frame overhead symbols effectively lowers the first information rate to a second information rate. The second information rate can be expressed as M'/N', where M/N=(M'+b) (N'+b) and b is an integer chosen to provide the second information rate at a desired value. M, N, M', N' and b are all integers. Thus, for the example provided above, the first information rate is 122/128 or 121/127, and the second information rate (b=2 or b=1) is 120/126=20/21. The total number of symbols per block (N) is less than or equal to $2^n+1$, where n is the number of bits in each of the symbols. Thus, where seven-bit symbols are used, the number of symbols per block cannot exceed 129. X is chosen to provide enough n-bit overhead symbols (PX) to implement a desired function (e.g., synchronization and/or control) at the receiver. In the case where a 28-bit synchronization word is necessary, and two control symbols are necessary (e.g., one for identifying the modulation scheme and one for parity) a total of six seven-bit symbols (PX=6) will be required. This accounts for four seven-bit symbols used to provide the 28-bit synchronization pattern and two symbols for the control functions.

In order to determine the frame size F that is necessary to achieve the desired effective information rate given the initial information rate, the relationship F=M'P/(N-M)b is used. P is the smallest value integer that will render F an integer, and establishes the number of overhead symbols to be added per frame. In the example provided above, where the first information/transmission rate is 122/128, and the second information/transmission rate is 120/126 (i.e., b=2), P=1 and F=10.

It should now be appreciated that the present invention provides a method for appending overhead, such as synchronization data, to a plurality of frames of coded blocks in order to obtain a desired final information/transmission rate. The method can be used for communicating digital data for any desired application using any acceptable modulation and coding scheme for the particular application. The method is implemented by dividing the coded blocks in a data stream into a succession of frames, where each frame comprises an integer number of coded blocks. The integer number of coded blocks can be scaled as necessary to provide superframes that each include a number of overhead symbols necessary to effect a given function (e.g., synchronization) at a receiver. In the specific embodiments illustrated, a 120/126 Reed-Solomon system is replaced by a 122/128 Reed-Solomon system with frame overhead by inserting one frame overhead symbol for every ten Reed-Solomon blocks. Also illustrated is a 120/126 Reed-Solomon system that is replaced by a 121/127 system with frame overhead wherein one overhead symbol is inserted for every twenty Reed-Solomon blocks. All of these systems have substantially the same error correction capability and the same transmission/information ratio, even after the insertion of frame overhead.

The invention can be used to meet any desired transmission standard, while providing a desired information rate. For example, the Moving Picture Experts Group (MPEG) has established a data transmission scheme in which a Reed-Solomon coding rate of 188/204 is used. If it is desired to use an MPEG format with inserted synchronization and/or control data at an effective rate of 180/196, a frame size F=M'P/(N-M)b is used. Thus:

F=180 P/(16)8=180 P/128=45 P/32; such that for P=32, F=45.

The resultant scheme will use frames containing forty-five coded blocks of 188 symbols per block.

Thirty-two (i.e., P) overhead symbols will be added to each of a plurality X of said frames, where X is chosen to provide enough frame overhead symbols (PX) to provide a desired synchronization and/or control function(s). The effective transmission rate will be 180/196, and is particularly useful for a 64 QAM rate 4/5 trellis coding scheme to provide an information rate of 14/15×180/196=6/7. The term 14/15 results from the use of a rate 4/5 trellis code in which every ten uncoded bits and four coded bits input (14 bits total) result in ten uncoded and five coded bits output (15 bits total).

Although the invention has been described in connection with various specific embodiments, it will be appreciated by those skilled in the art that numerous adaptations and modifications may be made thereto without departing from the spirit and scope of the invention, as set forth in the claims.

I claim:

1. A method for communicating block coded digital data and associated synchronization data comprising the steps of:

providing a data stream having a succession of coded blocks, each block containing an integer number N of symbols wherein an integer number M of said symbols comprise information to be transmitted and the remaining N-M of said symbols comprise error correcting information, the ratio M/N comprising a first information rate;

dividing the coded blocks in said data stream into a succession of frames, each frame comprising F of said coded blocks; and adding P frame overhead symbol(s) for each of said frames, said frame overhead symbols containing synchronization data; wherein:

(i) the addition of said frame overhead symbols effectively lowers said first information rate to a second information rate M'/N', where M/N=(M'+b)/(N'+b) and b is an integer chosen to provide said second information rate at a desired value, (ii) $N \leq 2^n+1$, where n is the number of bits in each of said symbols, (iii) F=M'P/(N-M)b, and (iv) P is an integer chosen to render F an integer.

2. A method in accordance with claim 1 wherein:

a plurality X of said frames are formed into a superframe containing FX coded blocks and PX frame overhead symbols; and X is chosen to provide enough n-bit frame overhead symbols to achieve synchronization for the superframe at a receiver.

3. A method in accordance with claim 2 wherein:

said first information rate is 122/128;

said second information rate is 120/126;

P=1;

F=10; and

X=6.

4. A method in accordance with claim 3 wherein said PX frame overhead symbols are appended to the end of said superframe.

5. A method in accordance with claim 2 wherein said PX frame overhead symbols are appended to the end of said superframe.

6. A method in accordance with claim 1 wherein said coded blocks are Reed-Solomon blocks, each containing 128 seven-bit symbols.

7. A method in accordance with claim 6 wherein:

said first information rate is 122/128;

each frame comprises ten Reed-Solomon blocks; and the provision of one frame overhead symbol for each frame provides said second information rate at 120/126.

8. A method in accordance with claim 7 wherein said frames are grouped into superframes, each superframe comprising six of said frames with six frame overhead symbols appended to the end of the superframe.

9. A method in accordance with claim 1 wherein P is the smallest value integer that will render F an integer.

10. A method in accordance with claim 1 wherein:

said first information rate is 188/204;

said second information rate is 180/196;

P=32; and

F=45.

11. A method for communicating block coded digital data and associated overhead data comprising the steps of:

providing a data stream having a succession of coded blocks, each block containing an integer number N of symbols wherein an integer number M of said symbols comprise information to be transmitted and the remaining N-M of said symbols comprise error correcting data, the ratio M/N comprising a first information rate;

dividing the coded blocks in said data stream into a succession of frames, each frame comprising F of said coded blocks; and adding P frame overhead symbol(s) for each of said frames, said frame overhead symbols containing data necessary to provide a function at a receiver; wherein:

(i) the addition of said frame overhead symbols effectively lowers said first information rate to a second information rate M'/N', where M/N=(M'+b)/(N'+b) and b is an integer chosen to provide said second information rate at a desired value, (ii) $N \leq 2^n+1$, where n is the number of bits in each of said symbols, (iii) F=M'P/(N-M)b, and (iv) P is an integer chosen to render F an integer.

12. A method in accordance with claim 11 wherein:

a plurality X of said frames are formed into a superframe containing FX coded blocks and PX frame overhead symbols; and X is chosen to provide enough n-bit frame overhead symbols to provide said function at the receiver.

13. A method in accordance with claim 12 wherein said PX frame overhead symbols are added at the end of said superframe after said X frames.

14. A method in accordance with claim 11 wherein P is the smallest value integer that will render F an integer.

15. A method in accordance with claim 11 wherein:

said first information rate is 122/128;

said second information rate is 120/126;

P=1; and

F=10.

16. A method in accordance with claim 11 wherein:

said first information rate is 188/204;

said second information rate is 180/196;

P=32; and

F=45.

* * * * *